(No Model.)
E. H. JOHNSON & R. LUNDELL.
SUPPLY SYSTEM FOR ELECTRIC RAILWAYS.
No. 523,166. Patented July 17, 1894.
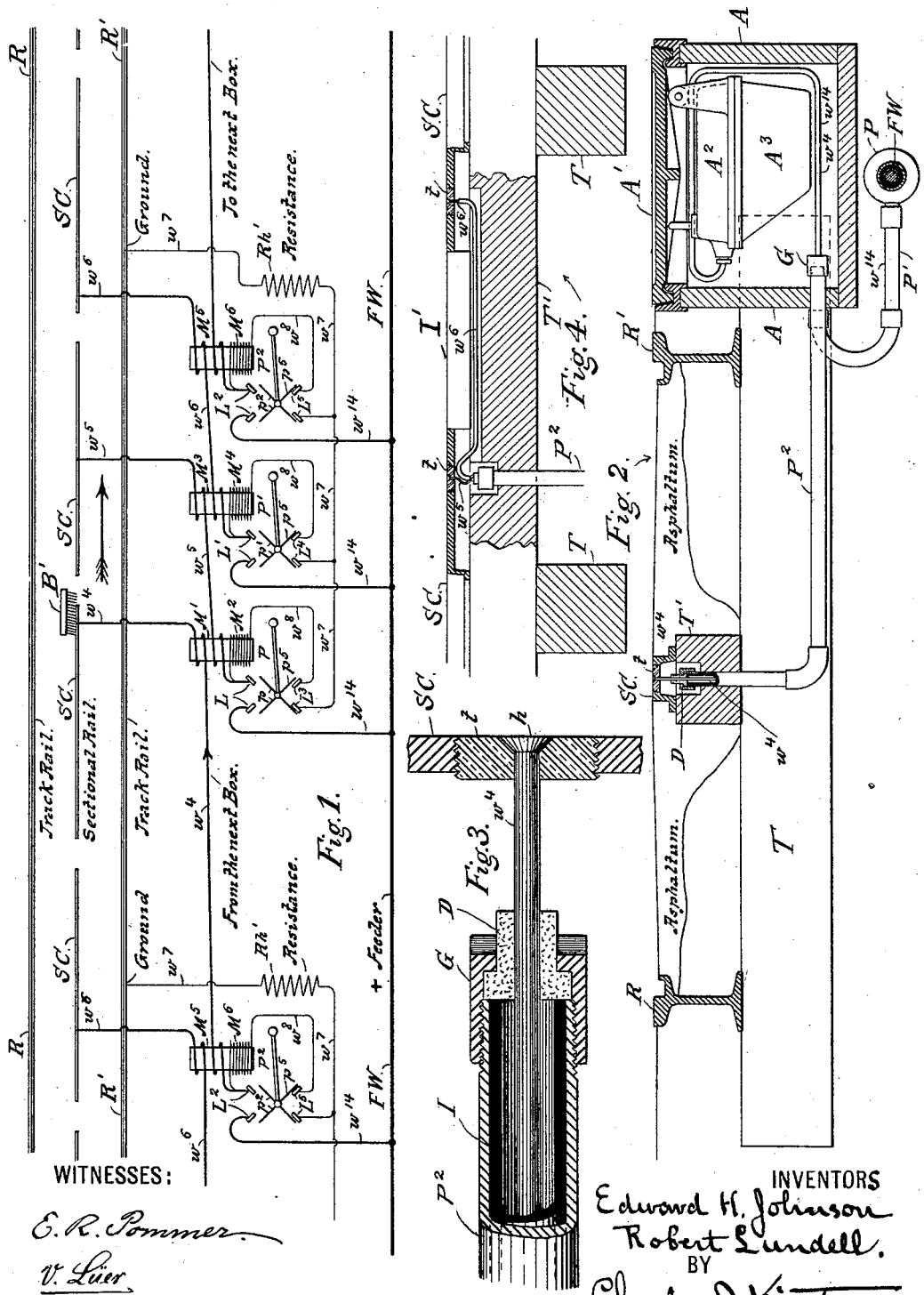
WITNESSES:
E. R. Pommer
V. Lier
INVENTORS
Edward H. Johnson
Robert Lundell
BY
Charles J. Kintner
ATTORNEY

UNITED STATES PATENT OFFICE.

EDWARD H. JOHNSON, OF NEW YORK, AND ROBERT LUNDELL, OF BROOKLYN, ASSIGNORS TO THE JOHNSON SUBTROLLEY COMPANY, OF NEW YORK, N. Y.

SUPPLY SYSTEM FOR ELECTRIC RAILWAYS.

SPECIFICATION forming part of Letters Patent No. 523,166, dated July 17, 1894.

Application filed February 10, 1894. Serial No. 499,826. (No model.)

*To all whom it may concern:*

Be it known that we, EDWARD H. JOHNSON, of New York, in the county of New York, and ROBERT LUNDELL, of Brooklyn, in the county of Kings, State of New York, both citizens of the United States, have made a new and useful Improvement in Electric Railways, of which the following is a specification.

Our invention relates to improvements in that type of electric railways in which the propelling current is taken from exposed or bared sectional trolley conductors automatically connected, as a car or vehicle proceeds over the route, to an insulated current main in direct circuit connection with a dynamo electric machine or other source of electrical energy located at a power house, and is directed especially to improvements upon an invention disclosed in a prior application filed by us in the United States Patent Office on the 16th day of January, 1894, and bearing Serial No. 497,022.

Our invention has for its objects, first, the rendering of the operation of such a system more certain and the prevention of the chattering or unnecessary vibrations of the switching armature levers more probable and also the prevention, as far as possible, of arcing at the switch contact points: second, to provide means whereby the insulation of the current feeder and the branch or sub feeder circuits running to the switch boxes and trolley conductors is rendered more perfect. These objects are accomplished by the apparatus hereinafter described, the essentially novel features of which are particularly pointed out in the claims at the end of the specification.

Referring now to the drawings: Figure 1 is a diagrammatic view illustrating a tramway, four sectional trolley conductors, a current feeder or main and the circuits and circuit connections between the switching electromagnets, the current feeder or main and the sectional trolley conductors as embodied in our improvement. Fig. 2 is a cross sectional view taken through the road-bed showing our improved manner of more perfectly insulating the current feeder or main and the sub feeders or branch circuits, together with our novel manner of connecting the latter to the sectional trolley conductors, one of the switch boxes being shown in elevation on the right. Fig. 3 is an enlarged detail broken sectional view illustrating more clearly our improved manner of connecting the branch or sub feeder circuits to the sectional trolley conductors. Fig. 4 is a vertical section taken through Fig. 2 parallel with the tram rails, a portion of the longitudinal stringer which supports the trolley conductors being shown as broken away in section for the purpose of illustrating our preferred form of circuit connections to adjacent pairs of sectional trolley conductors.

Referring now to the drawings in detail: F W represents the current feeder or main which is located in a conduit tube P made preferably of metal and provided with an insulating lining I, such conduit tubing being well known in the electrical art. This tube is located beneath the body of the road-bed at any preferred point and is provided with analogous branch or sub feeder tubes P' P², the former running to protecting switch boxes A and the latter running from these protecting switch boxes to the center of the road-bed where they extend upward into a longitudinal stringer T', preferably creosoted, said stringer resting upon the horizontal cross ties T which support also the tram rails R R'. This stringer T' is embedded in asphaltum and constitutes also a support for the sectional trolley conductors SC, SC, SC. The conduit tubes P' and P² are provided with water tight joints at the various branching points and at the entrances into the protecting boxes A and in the upper surface of the stringer T' with screw threaded gaskets G, D being rubber or equivalent yielding packing adapted to render the joint between them and the conductors $w^4$ or $w^{14}$ water tight when the gaskets G are screwed home. The main or feeder F W, either insulated or not as desired, is drawn into the main conduit pipe P, and branch or sub feeders $w^{14}$ of smaller cross section and of similar nature are likewise drawn into the branch or sub feed pipes P′ P², the conductors $w^4$, $w^{14}$ in the protecting boxes A being either rubber covered or insulated in any other preferred manner and leading into the switch boxes A² A³ or to the sectional trolley conductors SC as at $w^4$, $w^5$, $w^6$, see Fig. 1. When these branch or sub feeders $w^4$, $w^5$, $w^6$ are put into position their inner ends are passed through the rubber packing D and the gaskets G until they extend upward through screw threaded holes in the sectional trolley conductors SC, SC, SC. The gaskets G are then turned firmly home thereby rendering the joints absolutely water tight. The openings in the stringer T′ about the gaskets G and the upper ends of the conductors $w^4$, $w^5$, $w^6$ and beneath the sectional trolley conductors SC, SC are then filled with asphaltum after which the ends of the conductors $w^4$, $w^5$, $w^6$ are threaded through short screw plugs $t$ which are screwed home into the body of the sectional trolley conductors, the ends of the conductors being finally riveted, one of said rivet heads being shown at $h$, Fig. 3.

There will of course be one branch or sub feeder conduit from the main conduit to each switch box and they will enter the exterior switch boxes A at any desired point, the arrangement being preferably such as will render the branch circuits inclosed therein most accessible for drawing them into position and removing them when desired. We prefer to provide one branch or sub feeder conduit only for each pair of conductors $w^4$ $w^5$ or $w^5$ $w^6$ running from the boxes A to the sectional trolley conductors SC, SC, thereby cheapening the structure as much as possible, the conductors $w^5$, $w^6$, &c., running therethrough being each surrounded by an independent coating of insulating material as clearly shown in Fig. 4, wherein is illustrated two sectional trolley conductors SC, SC separated from each other by a block of insulating material I′ flush with their top surfaces, a groove being provided in the upper surface of the stringer T′ for the conductor $w^6$ running to the sectional trolley conductor on the right, the screw plug connections $t$ $t$ being the same as described in connection with Figs. 2 and 3. In building this part of the structure the conductors would be drawn in place in the conduit tubes as before and the ends secured to the screw plugs $t$ $t$ as already described, after which the entire opening between the sectional trolley conductors would preferably be filled with hot asphaltum or equivalent liquid insulating material and the insulating block I′ forced into position and secured to the stringer T′ by screws or otherwise, the arrangement being such that these insulating blocks I′ may be removed at any time and the parts examined. In place of hot asphaltum we may use paraffine in which event on applying heat to the trolley conductors and the insulating block I′ the paraffine may be melted and withdrawn from the opening with a pump or otherwise.

M′ M², M³ M⁴, M⁵ M⁶ are switch operating electro-magnets located in sets of three in switch boxes A² A³ each surrounded and supported by a protecting box A having a removable metal cover A′ flush with the roadbed.

The sectional trolley conductors SC, SC, SC are connected, in the present invention, through coils of few convolutions or low resistance M′ running in each instance through an additional set of coils on each adjacent pair of electro-magnets as shown at the upper coil of the magnet M⁵ and the middle coil of the magnet M³, said low resistance coils being connected directly to the high resistance shunt coil of the last magnet of the pair, as for instance though the coil M⁴, the circuit being normally earthed through the conductor $w^8$, movable contacts $p^5$ carried by the armature lever $p'$, back contacts L⁴ through a common rheostat or resistance R$h'$, by conductor $w^7$ to the tram rail R′. It will be noted that the next conductor $w^5$ is in like manner connected through an additional upper coil in the magnet M³, central coil of the magnet M′ and through the high resistance coil M² of that magnet, conductor $w^8$, movable contacts $p^5$, fixed contacts L³ and conductor $w^7$ through the same rheostat or resistance R$h'$, by conductor $w^7$ to ground, the last magnet M being provided with a similar low resistance coil in the conductor $w^4$ extending to a similar central coil on the magnets M⁵ M⁶ with like circuit connections in the first magnet in the next switch box to the left.

The operation of this part of the improvement is as follows: Suppose that the vehicle or car, which is not shown, is provided with the usual propelling electric motor and a storage battery connected in multiple arc relation which battery, when charged, is of substantially the same electro-motive force as is the generator at the power house together with switches and circuit connections between the storage battery, the motor, the wheels of the vehicle, and the contact brush B′, such a combination of elements being well understood by those skilled in the art and that the operating switch which connects the battery and the motor to the contact brush B′ is for the time being open. Under this condition of affairs there is no current flowing through any of the magnets and their armature levers therefore are on their back stops as shown. On closing both the motor and the battery circuit simultaneously current will flow from the battery by brush B′, conductor $w^4$, upper low resistance coil of magnet M′ M², conductor $w^4$, central low resistance coil of the magnet M⁵ M⁶ through the high resistance shunt coil M⁶, conductor $w^8$, fixed contact stops L⁵, movable contact stops $p^5$ carried by the armature lever $p^2$, conductor $w^7$, rheostat or resistance R$h'$, conductor $w^7$ to earth through the tram rail R′ and back to the starting point through the other tram rail R. This will cause the armature lever $p^2$ in the last magnet of the switch box, just passed, to be elevated suddenly after the manner of the armature of a trembler bell, a very slight spark appearing between the movable contacts $p^5$ and the fixed contacts $L^5$. The impetus of the armature, however, will be sufficient to carry it forward so that immediately the front movable contacts $p^2$ will close the motor or working circuit as follows: From the positive pole of the dynamo at the power house through the current feeder or main FW, sub feeder or branch $w^{14}$, movable contacts $p^2$, fixed contacts $L^2$, central or low resistance coil of the magnet $M^5 M^6$, conductor $w^4$, upper or low resistance coil of magnet $M' M^2$, conductor $w^4$, contact brush B′, through the switch and motor on board of the vehicle not shown and to earth through the wheels and tram rail R′ to the other pole of the generator. This working current through the central low resistance coil of the magnet $M^5 M^6$ will hold the armature $p^2$ in its upper position and will simultaneously cause the armature lever $p$ of the magnet $M' M^2$ to draw its armature lever forward closing the working circuit from the current feeder FW through the sub feeder $w^{14}$, fixed contacts L, movable contacts $p$, central low resistance coil of the magnet $M' M^2$ and upper low resistance coil of the magnet $M^3 M^4$, by conductor $w^5$ to the next sectional trolley conductor in advance, thereby rendering that sectional conductor alive for the trolley or brush B′ when it advances upon it. It will be apparent therefore that as the car advances and the working circuit is kept closed, the armature levers of the several switching magnets will be controlled by the working current. Should there be, however, any such variation in this current as to prevent this working, then the storage battery current, acting always through the high resistance shunt coils, will elevate the movable switch contacts into a working position in proper sequence, thus rendering it absolutely certain that so long as the generator is running at the power station and the storage battery possessed of sufficient electro-motive force, it will be utterly impossible to prevent the motor-man from obtaining control of the working current for his motor.

It will be understood of course that the convolutions of the extra coils are so few and therefore of such low resistance, that the storage battery current when acting solely through them cannot affect the switching armature levers but will always actuate that switching armature lever next in the rear as the car advances through the agency of the high resistance shunt coil and the back contact circuit connections as already explained.

It will be seen that never are more than three sectional trolley conductors either alive or given working potential at the same time and that by reason of the combined controlling effect of the working current and the storage battery current greater certainty of action is given, and also because of the peculiar arrangement of circuits unnecessary chattering or vibrations of the armature levers and arcing at their contact points is practically avoided.

We do not limit ourselves to the special details of construction herein shown and described as many of the features of construction might be materially departed from and still come within the scope of our claims hereinafter made.

We believe we are the first to devise a system of conduiting for more perfectly insulating electric railway conductors and their branch feeders in combination with exposed sectional trolley conductors operatively connected to the sub feeder circuits, and our claims in this particular are to be construed as of the most generic nature.

Having thus described our invention, what we claim, and desire to secure by Letters Patent of the United States, is—

1. An electric railway provided with a current feeder or main, a series of sectional trolley conductors, branch or sub feeder circuits and electro-magnetic switching devices for connecting the trolley conductors with the current feeder or main, the branch or sub feeder circuit running from each trolley conductor including a low resistance coil on the switch magnet which controls the circuit connections to an adjacent trolley conductor and a low and a high resistance coil on its own switch magnet.

2. An electric railway provided with a current feeder or main, a series of sectional trolley conductors, branch or sub feeder circuits and electro-magnetic switching devices for connecting the trolley conductors with the current feeder or main, the branch or sub feeder circuit running from each trolley conductor normally including a low resistance coil on the switch magnet which controls the circuit connections to an adjacent trolley conductor, a low and a high resistance coil on its own magnet and an additional resistance in circuit therewith.

3. An electric railway provided with a current feeder or main, a series of sectional trolley conductors and branch or sub feeder circuits for connecting said sectional trolley conductors to the current feeder or main, in combination with electro-magnetic switching devices for effecting such connection, the electro-magnets of each switching device being provided with a coil of high resistance and a coil of low resistance connected in series, the high resistance coil being connected to earth and the low resistance coil being connected through a similar low resistance coil surrounding the core or cores of the electro-magnet which controls the switch of the next adjacent branch or sub feeder circuit, substantially as described.

4. An electric railway provided with a current feeder or main, a series of sectional trolley conductors and a series of branch or sub feeder circuits for connecting said sectional trolley conductors to the current feeder or main, in combination with electro-magnetic switching devices for effecting such connection, the electro-magnets of each switching device being provided with a high resistance coil of many convolutions and a low resistance coil of few convolutions connected together in series, the other terminal of the high resistance coil being connected normally through a circuit interrupting device and to earth, the like terminal of the low resistance coil being connected through a similar low resistance coil around the core or cores of the electro-magnet which controls the switch for the next adjacent branch or sub feeder circuit, said latter coil being in turn connected to the next adjacent sectional trolley conductor, substantially as described.

5. An electric railway provided with a current feeder or main, a series of sectional trolley conductors, branch or sub feeder circuits for connecting said sectional trolley conductors to the current feeder or main, electro-magnetic switching devices for effecting such connection, each of such branch circuits being included in circuit with the coils of electro-magnets which control the operation of two of the switches, in combination with an additional coil around the core of each electro-magnet, said additional coils being connected in each instance in series relation with one of the before mentioned coils and to a normally closed circuit interrupting device having circuit connections with the earth or a return conductor.

6. An electric railway provided with a current feeder or main, a series of sectional trolley conductors, a series of normally open branch or sub feeder circuits, electro-magnetic switching devices for closing the normally open branch circuits, circuit connections from each sectional trolley conductor through a low resistance coil on the electro-magnet which controls the switch for the normally open branch or sub feeder circuit for the next sectional trolley conductor in advance, and through additional low and high resistance coils about the electro-magnet which controls the switch for closing its own normally open circuit, substantially as described.

7. An electric railway provided with an insulating conduit and a series of branch or sub feeder insulating conduits, the feeder conduit being embedded in the road-way and the sub feeder conduits having their exterior ends secured in an insulating stringer or support which sustains a series of sectional trolley conductors, substantially as described.

8. An electric railway provided with an insulating conduit for its current feeder or main, a series of branch insulating conduits running therefrom to switch boxes and a second series of branch or sub feeder insulating conduits running from the switch boxes to sectional trolley conductors, substantially as described.

9. An electric railway provided with an insulating conduit for its current feeder or main, a series of branch insulating conduits running therefrom to switch boxes, a second series of branch or sub feeder insulating conduits running from the switch boxes to and through an insulating stringer which sustains a series of sectional trolley conductors, substantially as described.

10. In an electric railway an insulating conduit, a series of branch insulating conduits provided with water tight joints or connections, the outer ends of said branch conduits extending upward through an insulating stringer which acts as a support for sectional trolley conductors and being provided with insulating gaskets which surround the branch or sub feeder circuits where they are connected to the sectional trolley conductors, substantially as described.

11. In an electric railway a branch or sub feeder circuit inclosed in an insulating conduit and connected to a sectional trolley conductor by a screw plug, said branch or sub feeder circuit being surrounded at the point where it joins the sectional trolley conductor with a water tight gasket, substantially as described.

12. An electric railway provided with a current feeder or main located in an insulating conduit, a series of branch or sub feeder conductors extending through switching devices located in switch boxes to sectional trolley conductors resting upon an insulating stringer embedded in asphaltum, the branch or sub feeder conductors being located in branch conduits secured to the main conduit, the switch boxes, and the insulating stringer and all of said conductors being removable therefrom, substantially as described.

13. An electric railway provided with a series of sectional trolley conductors resting upon an insulating stringer, said sectional trolley conductors being separated from each other by blocks of insulating material, in combination with branch conductors passing through conduit tubes having their inner ends secured in the stringer, all of said branch conductors being removable from the conduit tubes, substantially as described.

14. An electric railway provided with a series of sectional trolley conductors resting upon an insulating stringer secured in the road-bed, in combination with branch conductors connected to the under sides of the sectional trolley conductors and passing through insulating conduit tubes secured to the stringer, all of said branch conductors being removable from the conduit tubes, substantially as described.

15. An electric railway provided with a series of sectional trolley conductors secured to an insulated stringer and separated from each other by blocks of insulating material, the adjacent ends of said sectional trolley conductors being connected by branch conductors embedded in grooves in the stringer and surrounded by a fusible insulating material, in combination with conduit tubes extending from the stringer beneath the roadbed and surrounding said branch circuits, all of said branch conductors being removable from the conduit tubes, substantially as described.

In testimony whereof we have hereunto subscribed our names this 7th day of February, 1894.

EDWARD H. JOHNSON.
ROBERT LUNDELL.

Witnesses:
C. J. KINTNER,
M. M. ROBINSON.